United States Patent [19]

Hewitt

[11] Patent Number: 5,222,752
[45] Date of Patent: Jun. 29, 1993

[54] FAIRING AND UTILITY ASSEMBLY FOR BICYCLES

[76] Inventor: George L. Hewitt, 30334 S.W. 158 Ct., Leisure City, Fla. 33033

[21] Appl. No.: 787,619

[22] Filed: Nov. 4, 1991

[51] Int. Cl.⁵ .............................................. B62J 17/04
[52] U.S. Cl. ............................... 280/288.4; 280/152.1; 224/36; 224/32 A; 296/78.1
[58] Field of Search ....... 280/202, 288.4, 304.3–304.5, 280/769, 770, 152.1, 152.2, 849, 852, 854; 180/90, 205, 219; 224/30 R, 31, 32 R, 33 A, 36, 32 A, 39, 41, 30 A, 902; 381/86; 296/70, 78.1, 191

[56] References Cited

U.S. PATENT DOCUMENTS

| 3,227,236 | 1/1966 | Burton | 224/32 A |
| 4,072,204 | 2/1978 | Leighton et al. | 180/205 |
| 4,473,251 | 9/1984 | Murayama | 296/78.1 |
| 4,515,405 | 5/1985 | Ogishima | 296/78.1 |
| 4,687,072 | 8/1987 | Komuro | 180/219 |
| 4,813,583 | 3/1989 | Carpenter | 296/78.1 |

FOREIGN PATENT DOCUMENTS 3525059  1/1987  Fed. Rep. of Germany ....... 180/2.2

Primary Examiner—Robert J. Oberleitner
Assistant Examiner—Anne Marie Boehler
Attorney, Agent, or Firm—Malloy & Malloy

[57] ABSTRACT

A fairing and utility assembly, to be mounted on a bicycle, the assembly including a front fairing assembly and a rear tail assembly, wherein the front fairing assembly includes a headlight, turn signals, and a dash light, with switches therefor mounted on a dashboard portion along side a cigarette lighter and a car stereo type audio source, which has a pair of speakers connected thereto and mounted above the dash in the front fairing. The front fairing includes a junction box from which the various utility functions receive electrical power, which is connected by a power input cable to a rechargeable motorcycle battery which is located in one of two compartments of the rear tail assembly, which further includes a rear light connected to the switches on the dashboard portion, an antenna for the car stereo type audio source, and a pair of aerodynamic fins attached to opposite sides of the rear tail assembly.

30 Claims, 5 Drawing Sheets

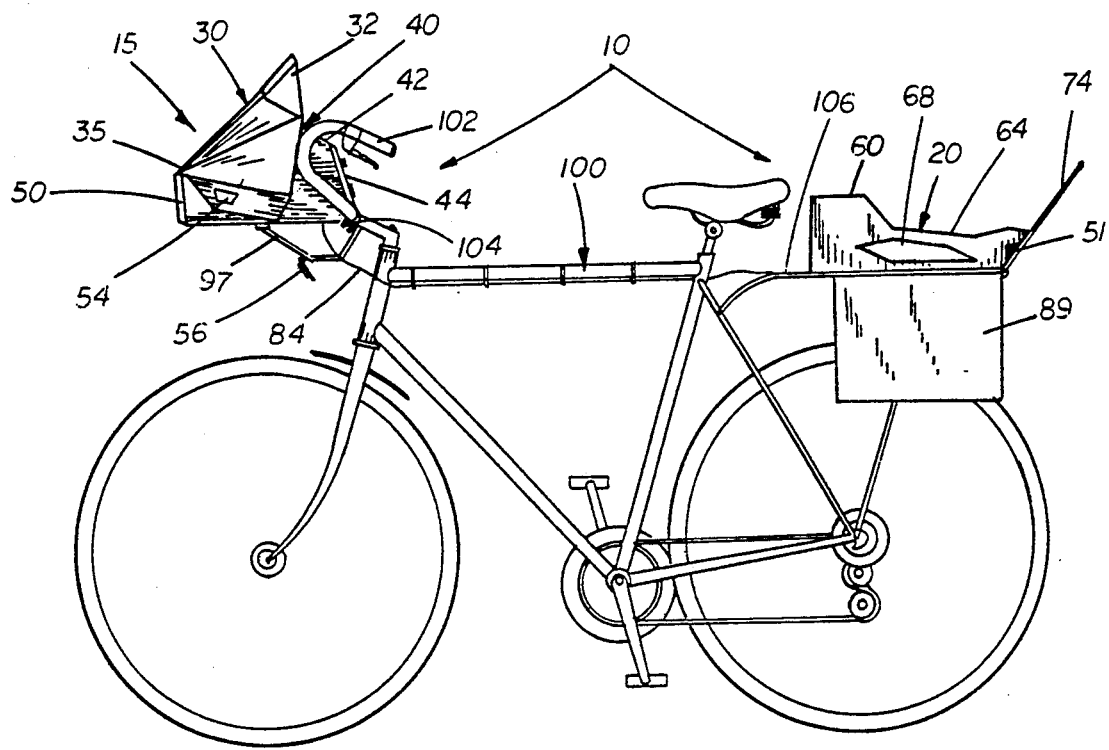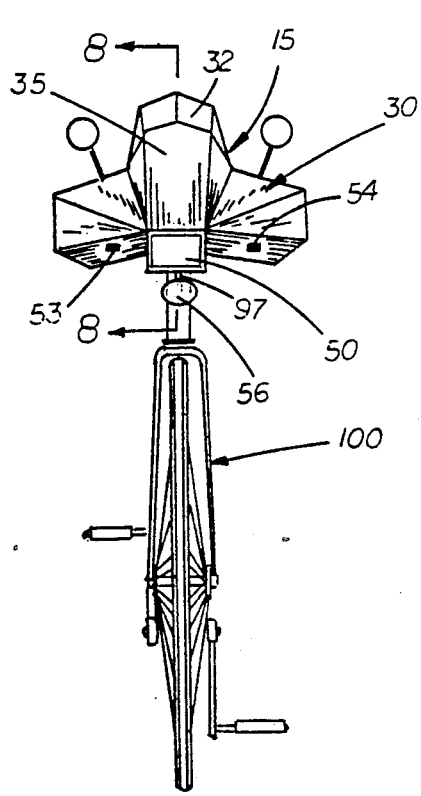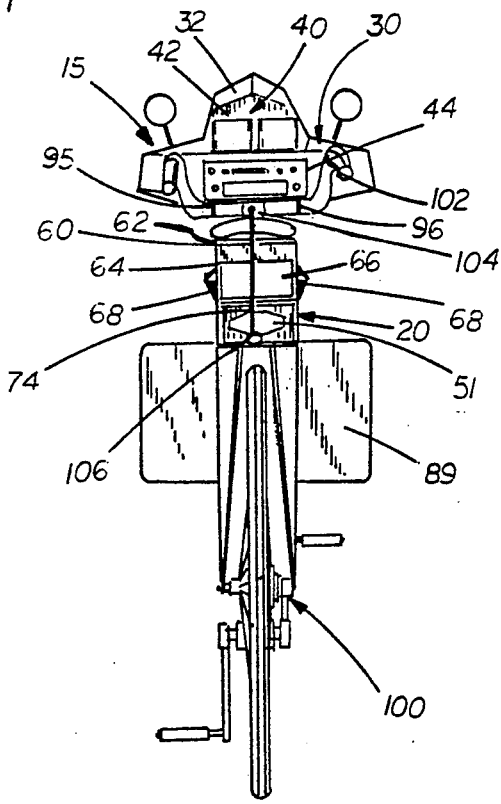

FAIRING AND UTILITY ASSEMBLY FOR BICYCLES

BACKGROUND OF THE INVENTION

1. Field of the Invention

This invention relates to a fairing and utility assembly adapted to be mounted to a bicycle, thereby providing the user with a convenient, aerodynamic, highly functional, and safety promoting array of utilities, all of which are powered from a single, continuously available, power source, which is conveniently stored in a rear portion of the assembly.

2. Description of the Prior Art

In today's world of high fuel prices and economic awareness, many motorists are turning to secondary means of transportation. Further, with today's health conscious society, people are looking to exercise as frequently as they can. For these reasons, many persons are turning to bicycles as their means of transportation and exercise. Unfortunately, many potential riders are discouraged from enjoying bicycling because of the limited safety afforded by bicycles when riding on streets crowded with automobiles, or, merely because they miss many of the comforts of riding in an automobile. For this reason, the applicant has designed a fairing and utility assembly for bicycles, which is aerodynamic so as to not burden the rider, and is highly functional with numerous safety features and conveniences.

In the past, various types of fairing assemblies have been designed for mounting on bicycles, such as the disclosures of, but the primary intent of such inventions was the fairing's aerodynamic functions, or the addition of storage space. Further, individual items such as lights, which are powered by a generator attached to the wheel and therefore only operate when the vehicle is moving, and radios, which are battery powered and have limited reception clarity and range, have been designed, but seemingly more as novelty items than as highly functional, aesthetically oriented and disposed features. As a result, a well organized, highly functional unit whose individual features are designed to capably fulfill their purpose and have an adequate power source to enable this, is a necessary and highly innovative improvement into the art of bicycling.

Although elaborate multi-function fairing assemblies have been utilized on motorcycles, the structure and design of such fairings is highly specialized for use on motorcycles, and is primarily designed for installation as part of the general motorcycle assembly, and not as an additive to be installed at a later date. Further, motorcycle fairings in addition to not being adaptable for mounting onto bicycles, are heavy and cumbersome as they are designed to be part of a motorized vehicle wherein weight differences will not have a large scale effect.

Applicant's invention is specifically designed for use on bicycles, and provides a functional arrangement of utilities powered by a powerful, rechargeable battery source, which is integrally designed as part of the system. Further, applicant's invention is not limited to the particular utility features presented, but may easily be adapted to include utilities of particular interest to the individual user.

SUMMARY OF THE INVENTION

The present invention is directed towards a fairing and utility assembly for mounting on a bicycle. The assembly includes two primary portions, those being a front fairing assembly and a rear tail assembly. The front fairing assembly which includes a hollow aerodynamic shell having a lower dash portion mounted to an inner face thereof, includes a junction box mounted internally to a lower surface of the shell which distributes electrical power from one source to a plurality of outputs. Connected to the plurality of outputs are a plurality of switching means, including an exterior light switch, a dash light switch, a turn signal switch, and a horn switch, all of which are mounted on the lower dashboard portion of the inner face. Further mounted to the aerodynamic shell, and electrically connected to their corresponding switching means are a plurality of light and signal means, including a headlight, a dash light, turn signals, and a horn. Additionally, included in the front fairing, and mounted on the lower dashboard portion, is a cigarette lighter and a car stereo type audio source, both of which also receive their power from the junction box outputs. The car stereo type audio source is connected to two speakers mounted above it on an upper portion of the inner face, and an antenna which is mounted on a back portion of the rear tail assembly. The junction box, which includes a fuse to prevent power overloads, is connected by a power input cable to a rechargeable 12-volt motorcycle battery positioned in the rear tail assembly. The rear tail assembly which has a front compartment and a rear compartment, securely holds the battery in the front compartment, and includes hingedly attached doors to secure the contents of the front compartment and rear compartment. Further included in the rear tail assembly is a taillight mounted to a back portion of the rear tail assembly and connected to the exterior light switch mounted in the front fairing assembly. In order to maintain the aerodynamic posture of the assembly, the rear tail assembly includes a pair of aerodynamic fine attached to opposite sides thereof. Finally, the structure includes mounting means whereby the front fairing assembly may be securely mounted to the bicycle's handlebars and handlebar support bracket, and the rear tail assembly may be securely mounted to a standard bicycle rack.

BRIEF DESCRIPTION OF THE DRAWINGS

For a fuller understanding of the nature of the present invention, reference should be had to the following detailed description taken in connection with the accompanying drawings in which:

FIG. 1 is a side view of the mounted fairing and utility assembly.

FIG. 2 is a front view of a mounted fairing and utility assembly.

FIG. 3 is a rear view of a mounted fairing and utility assembly.

DETAILED DESCRIPTION OF THE PREFERRED EMBODIMENT

Figure 4:
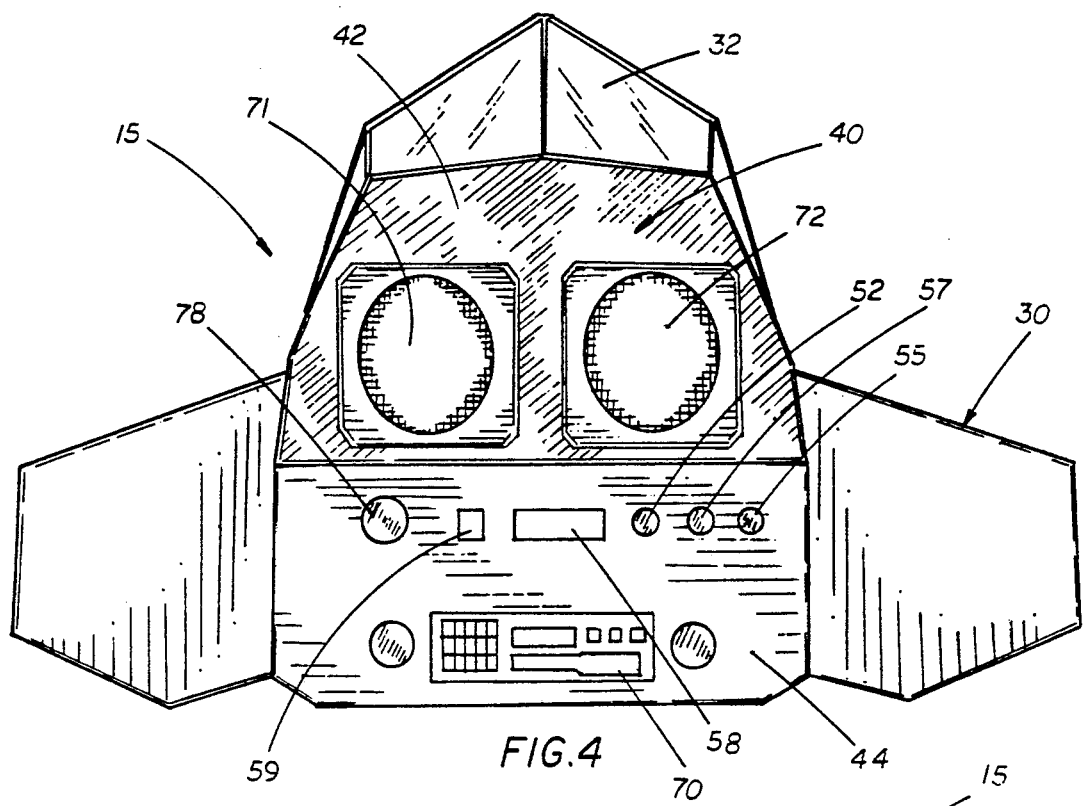
FIG. 4 is a detailed view of the inner portions of the front fairing assembly.

As shown in FIGS. 1-11, the present invention is directed towards a bicycle fairing and utility assembly, generally indicated as 10, to be used in conjunction with a bicycle 100. Referring to FIG. 1, the bicycle fairing and utility assembly is comprised primarily of two component parts, the front fairing assembly, generally indicated as 10, which is mounted on the handlebars 102 of the bicycle, and the rear tail assembly, generally indicated as 20, which is mounted on a bicycle rack 106. The front fairing assembly 15 includes a hollow aerodynamic shell 30 having an outer surface 35 and an inner face 40. The inner face 40 is further divided into an upper portion 42 and a lower dashboard portion 44 which may be removed. Attached to the upper portion of the inner face 40 is a transparent windscreen 32, which further contributes to the aerodynamic posture of the front fairing assembly 15. As seen in FIG. 2, the front fairing assembly 15 includes a headlight 50 mounted at the front of the outer surface 35 of the aerodynamic shell 30. Further mounted in the hollow aerodynamic sheet 30 are a right turn signal 53 and a left turn signal 54. As an additional safety feature, a horn 56 is secured to the support bar 97 which is positioned to support the front fairing assembly 15. Shown in FIG. 3, a taillight 51 is mounted to the rear tail assembly 20 to make the bicycle 100 additionally visible from behind.

Turning to FIG. 4, the front fairing assembly 15 contains a wide variety of utility functions mounted to the inner face 40 of the aerodynamic shell 30. Mounted to the lower dashboard portion 44 is an exterior light switch 52 which controls the operation of the headlight 50 and the taillight 51. Clearly and accessibly mounted beside the exterior light switch 52 is a horn switch 57 and a turn light switch 55, which function to operate the horn 56 and turn lights 53 and 54, respectively. Centrally mounted on the lower dashboard portion 44 is a dash light 58 which functions to illuminate the switches 52, 55, and 57, as well as the other features located on the lower dashboard portion 44. Mounted conveniently beside the dash light 58 is the dash light switch 59. An additional, optional feature which may be mounted to the lower dashboard portion 44 is an electric cigarette lighter 78, such as those found in an automobile. The cigarette lighter 78 is functional to smokers and non-smokers alike as it may also be used as a power source for items having a cigarette lighter adapted power input source. Accordingly, just as the cigarette lighter 78 is included primarily to meet the needs of a smoker, other such items of convenience may be readily mounted in addition to, or in the position of the cigarette lighter 78. Finally, there is a car stereo-type audio source 70 mounted to the lower dashboard portion. The car stereo-type audio source 70 is connected within the hollow aerodynamic shell 30 to a left speaker 71 and a right speaker 72 which are mounted to the upper portion 42 of the inner face 40. As a result of the positioning of the speakers 71 and 72 and the windshield 32, sound being emitted from the speakers 71 and 72 will be directed towards a rider.

Figure 5:
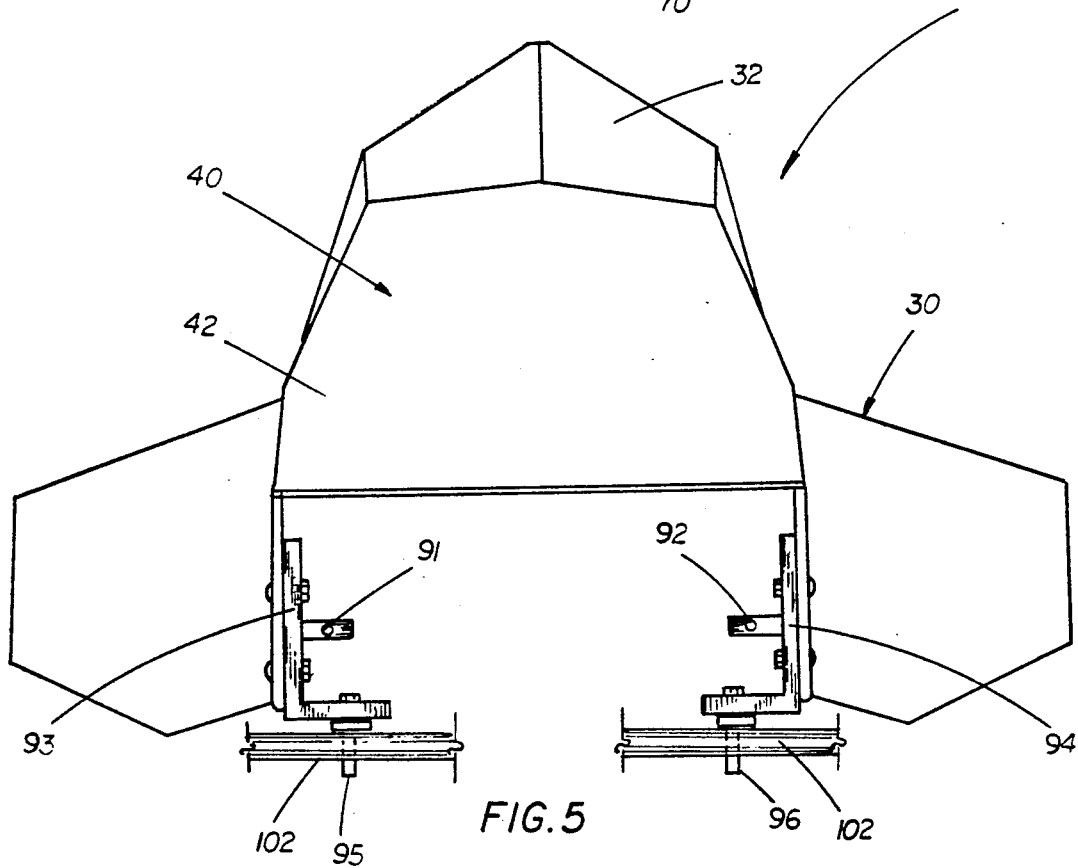
FIG. 5 is a detailed view of the mounting assembly of the front fairing assembly.

Detailed in FIG. 5 is a left L bracket 93 and a right L bracket 94 which are bolted to the aerodynamic shell 30. Further attached to the L brackets 93 and 94 are left clamp 95 and right clamp 96 which are secured to the bicycle handlebars 102 in order to provide a primary means of support for the front fairing assembly 15. Additionally mounted to the L brackets 93 and 94 are dash mounting brackets 91 and 92. The smaller dash mounting brackets 91 and 92 hold the lower dashboard portion 44 in position as part of the inner face 40 of the aerodynamic shell 30.

Figure 6:
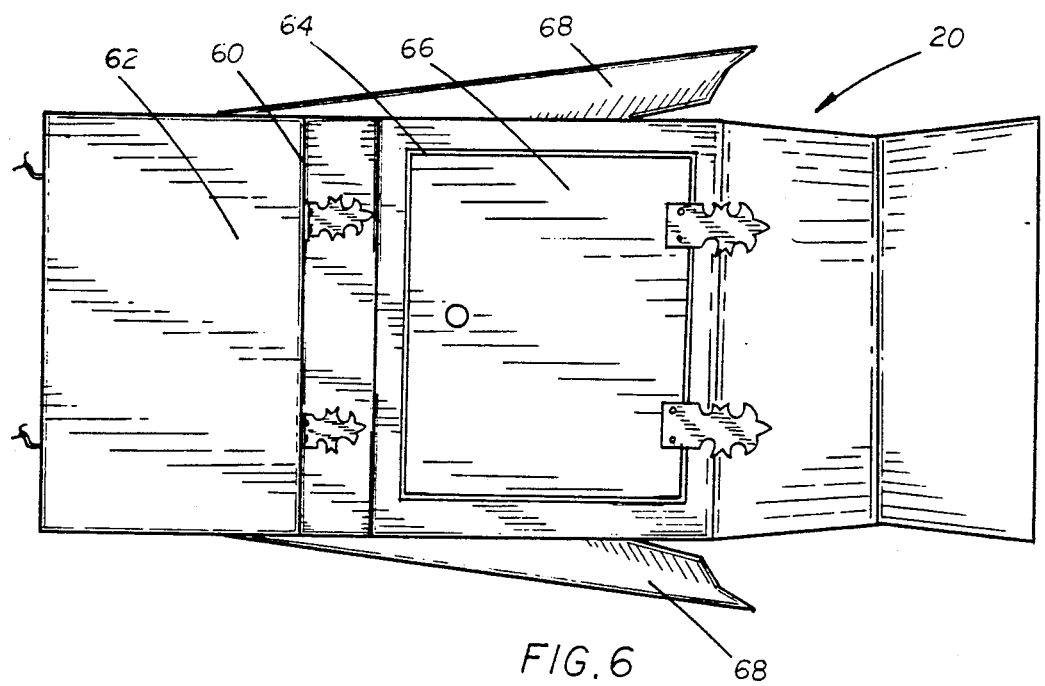
FIG. 6 is an overhead view of the rear tail assembly.
Figure 7:
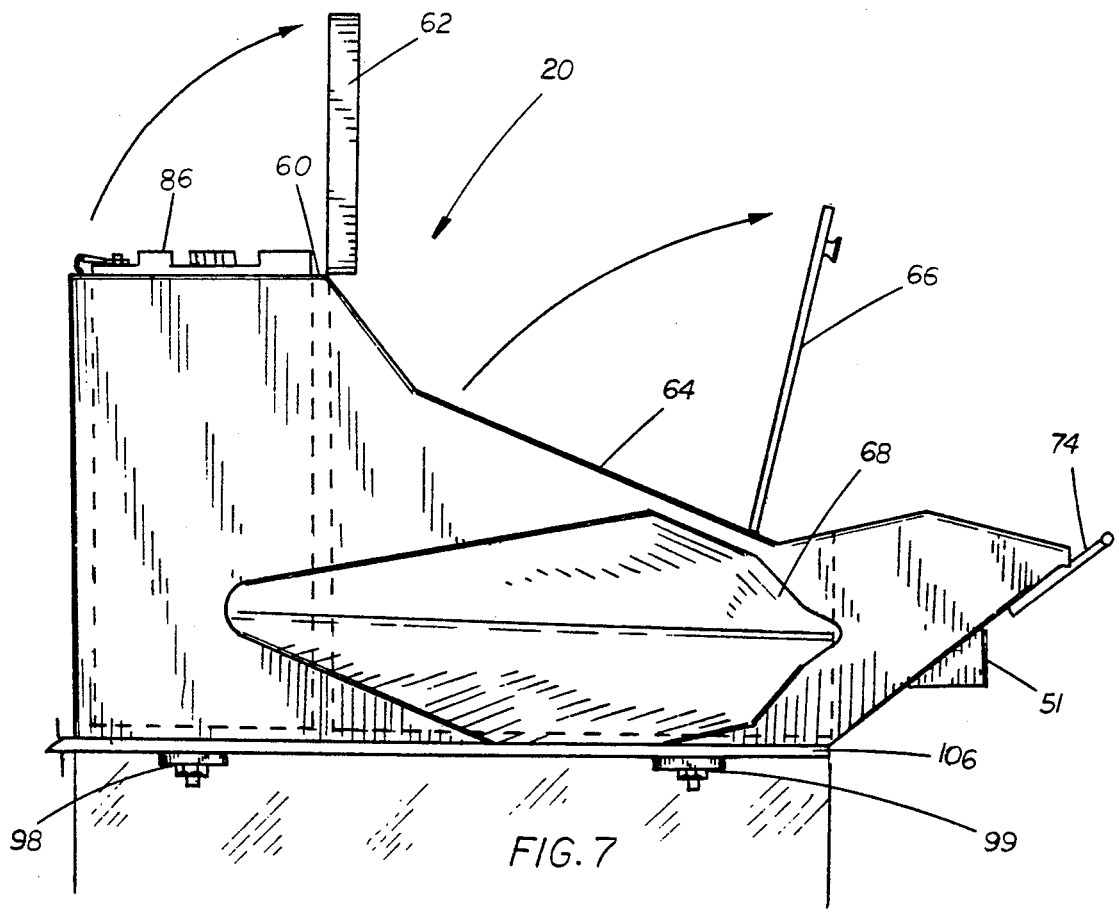
FIG. 7 is a side view of the rear tail assembly.

Turning to the rear tail assembly 20 and FIGS. 6 and 7, the rear tail assembly 20 includes a front compartment 60 and a rear compartment 64. Covering the front compartment 60, which securely houses a battery source 86, is a hingedly attached door 62. The rear compartment 64, which may be used for storage of various items, also includes a hingedly attached door 66, which maintains items placed within the rear compartment 64 securely contained. Additionally included on opposite sides of the rear tail assembly 20 ar fins 68, which are designed to give the rear tail assembly 20 additional aerodynamic qualities. Finally, there is an antenna 74 attached to the rear of the rear tail assembly 20 which is interconnected with the car stereo type audio source 70 mounted in the front fairing assembly 15, thereby providing clearer and more constant reception while listening to the radio.

Figure 8:
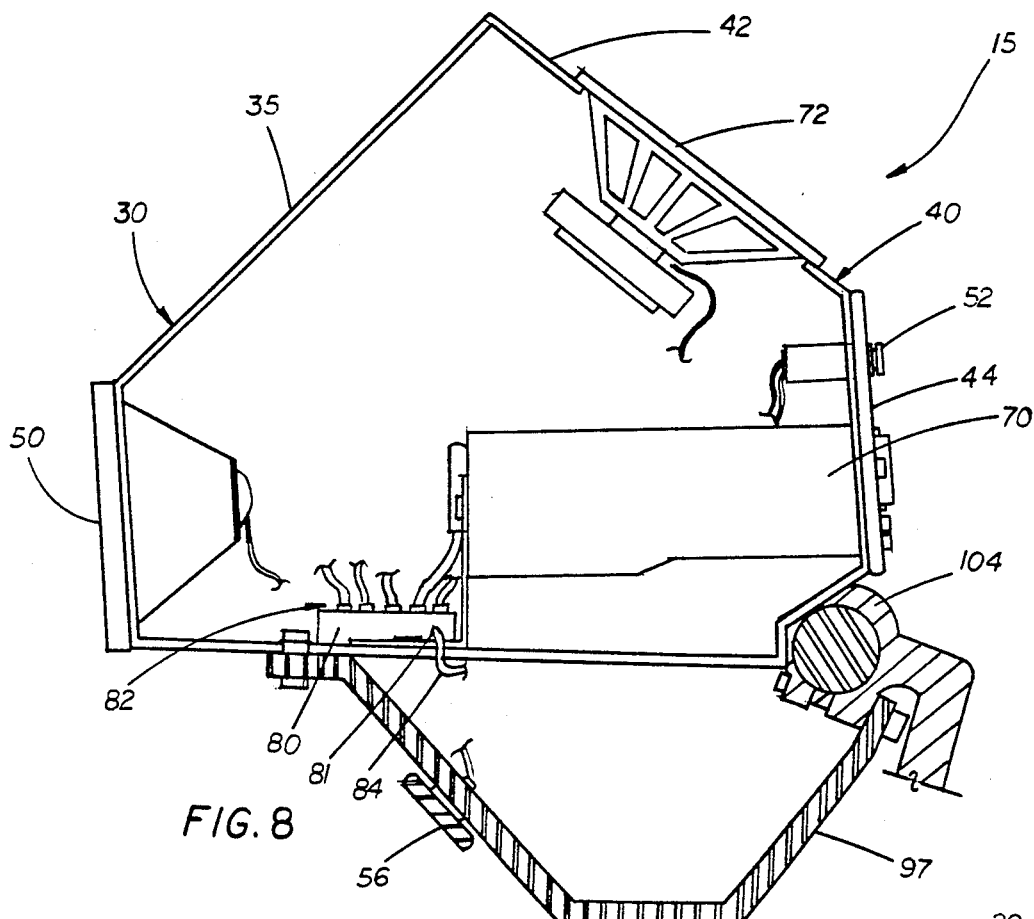
FIG. 8 is a cross-sectional view of the front fairing assembly of FIG. 2.

Detailed in FIG. 8 is the interior of the hollow aerodynamic shell 30 of the front fairing assembly 15. Contained within the aerodynamic shell 30 is a junction box 80 which has a plurality of output sources 82 that supply the necessary power to the utility functions mounted throughout the fairing and utility assembly 10. The junction box 80 contains a single input source 81 having a power input cable 84 which interconnects the junction box 80 with the battery 86 located in the rear tail assembly 20. Shown more clearly in FIG. 8, is the support bar 97 which is attached to the handlebar support bracket 104 of the bicycle 100, and keeps the front fairing assembly 15 in a fixed upright position.

Figure 9:
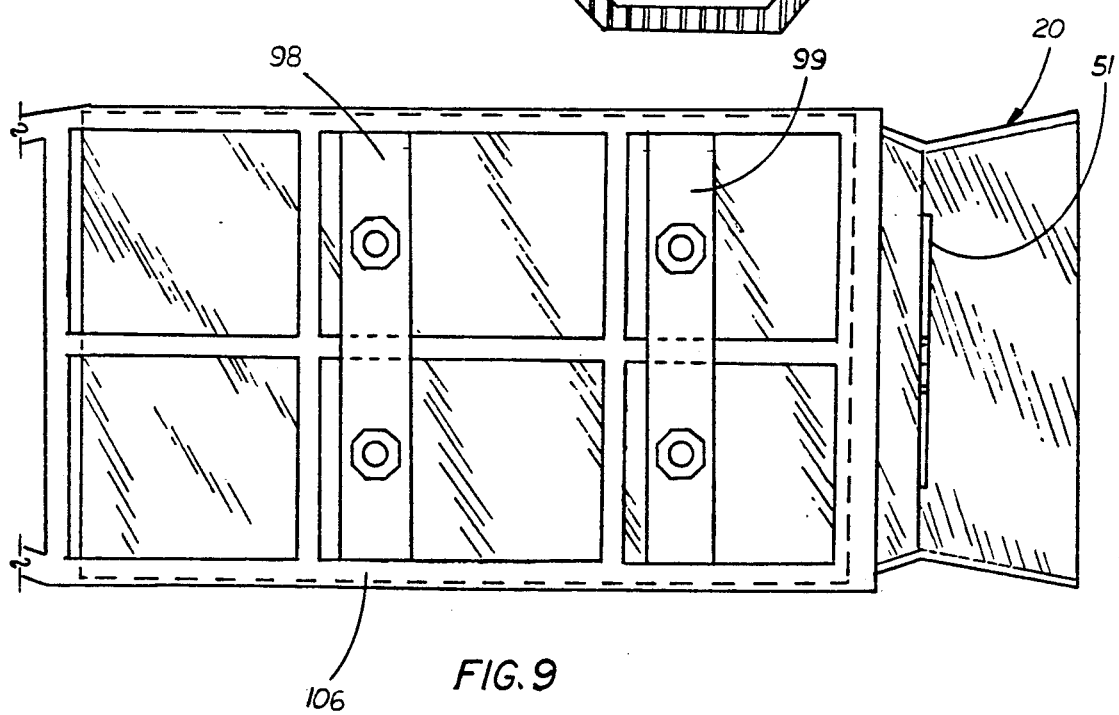
FIG. 9 is a detailed view of the mounting assembly of the rear tail assembly.

Referenced in FIG. 9 are the rear brackets 98 and 99 which function to bolt the rear tail assembly 20 securely to a bicycle rack 106.

Figure 10:
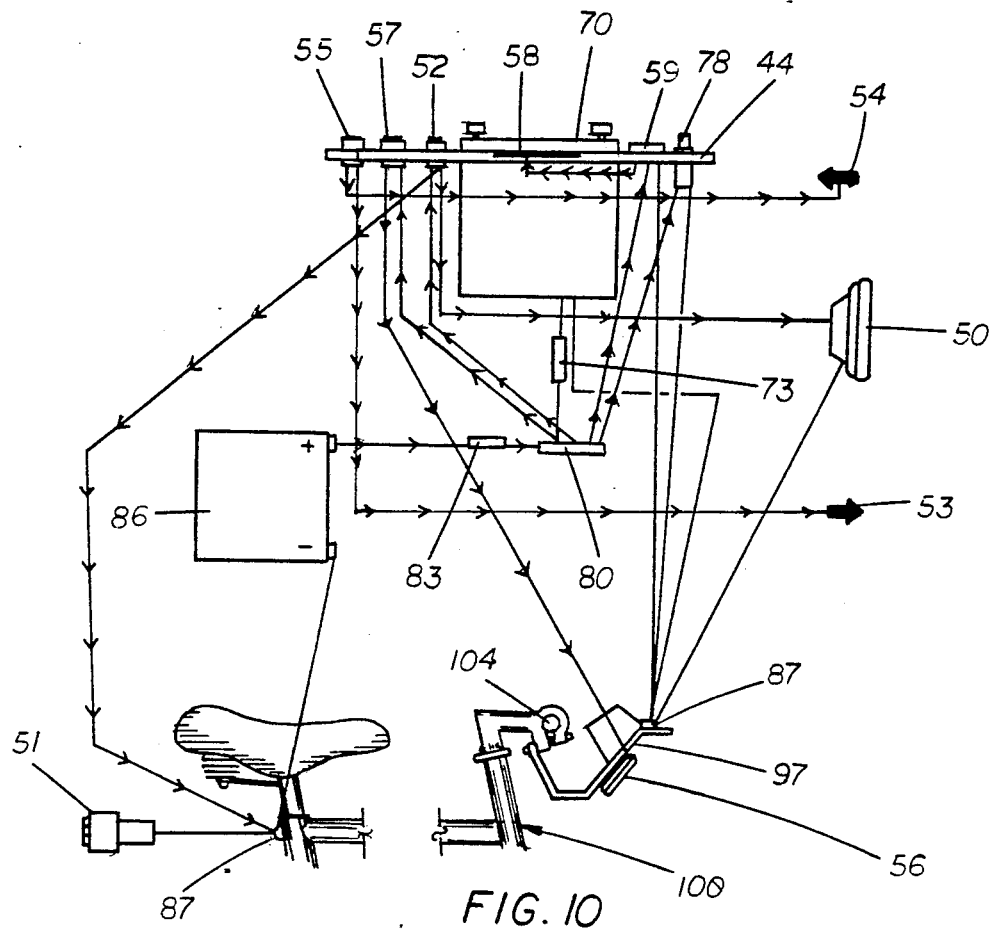
FIG. 10 is a detailed wiring diagram of the fairing and utility assembly.

Turning to FIG. 10, the battery source 86 feeds power directly to the junction box 80, which includes a fuse 83 to prevent a power overload. From the junction box 80, the power is distributed to the various utility functions. The car stereo type audio source 70 which includes its own secondary fuse 73, and the cigarette lighter 78, receive power input directly from the junction box 80. With regard to the headlight 50, taillight 51, turn lights 53 and 54, horn 56, and dash light 58, power is directed from the junction box 80 directly to the switching means. The exterior light switch 52 is connected to both the headlight 50 and the taillight 51, the turn light switch 55 is connected to both turn lights 53 and 54, and the horn 56 and dash light 58 are connected to the horn switch 57 and dash light switch 59, respectively. The various items, as well as the battery 86, are further attached to grounds 87.

Figure 11:
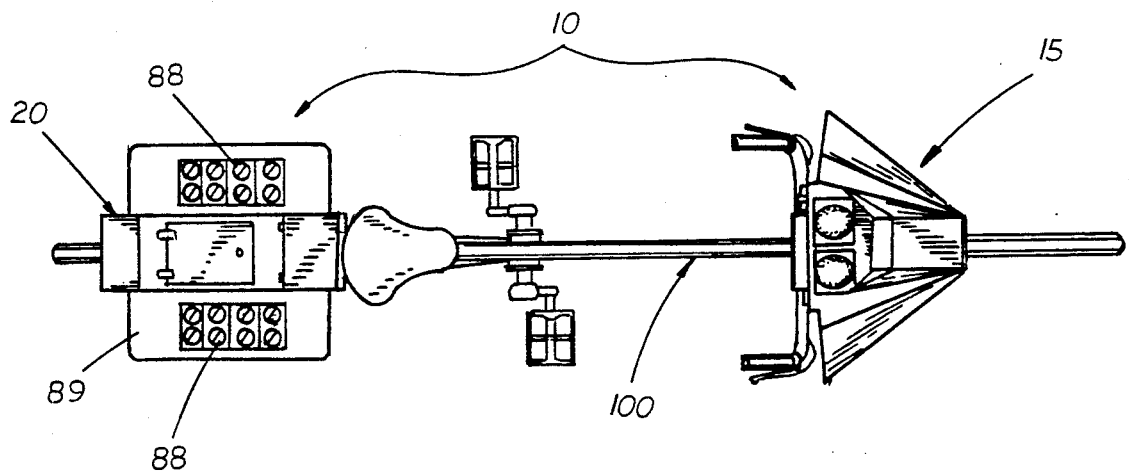
FIG. 11 is an overhead view of a mounted fairing and utility assembly.

Finally, as shown in FIG. 11, the rear tail assembly 20 is adapted such that a saddle bag type container 89 may be easily included in the assembly. The saddle bags 89 may be adapted such that solar collectors 88 ma be positioned thereon in order to provide a source of rechargeable power for the battery 86 contained within the front compartment 60. Alternate means of recharging may also be used to recharge the battery 86, which is generally a motorcycle type battery.

The utilities and functions described in the above-mentioned specifications are not intended to be the sole utilities which may be included and easily incorporated into the design. Variations consistent with the design and intent of the recited specifications may also be included.

What is claimed is:

1. For mounting on a bicycle; a fairing and utility assembly comprising:
   a front fairing assembly and a rear tail assembly,
   said front fairing assembly including a hollow aerodynamic shell,
   a junction box mounted internally to a lower surface of said shell, which distributes electrical power from one source to a plurality of outputs,
   a plurality of switching means mounted to said shell and being electrically connected to said plurality of outputs from said junction box,
   a plurality of light and signal means electrically interconnected to said plurality of switching means,
   a car stereo audio source mounted to said shell and being electrically connected to said junction box,
   said car stereo audio source being further connected to at least one speaker,
   said junction box in said shell of aid front fairing assembly being connected to a battery source in said rear tail assembly,
   said rear tail assembly including a front compartment and a rear compartment,
   mounting means for mounting said front fairing assembly and said rear tail assembly to the bicycle,
   said mounting means including a plurality of L-shaped support brackets which are clamped to the bicycle handle bars and bolted to said shell, and a support bar secured to said shell and the bicycle's handlebar support bracket, and
   said mounting means further including a plurality of brackets to fasten said rear tail assembly to a standard bicycle rack secured to the bicycle.

2. A fairing and utility assembly as recited in claim 1 wherein said shell includes an inner face and an outer surface.

3. A fairing and utility assembly as recited in claim 2 wherein said inner face includes an upper portion and a lower dashboard portion.

4. A fairing and utility assembly as recited in claim 3 wherein said mounting means includes dashboard mounting means for securing said lower dashboard portion to said shell.

5. A fairing and utility assembly as recited in claim 4 wherein said front fairing assembly includes a transparent windshield secured to an upper edge of said upper portion of said inner face.

6. A fairing and utility assembly as recited in claim 5 wherein said shell is made of fiberglass.

7. A fairing and utility assembly as recited in claim 6 wherein said junction box includes a fuse to prevent a power overload.

8. A fairing and utility assembly as recited in claim 7 wherein said junction box includes a power input cable which extends from said junction box in said front fairing to said battery source in said rear tail assembly, so as to transmit power to said junction box.

9. A fairing and utility assembly as recited in claim 8 wherein said battery source includes a 12-volt motorcycle battery.

10. A fairing and utility assembly as recited in claim 9 wherein said battery source is rechargeable.

11. A fairing and utility assembly as recited in claim 10 wherein said battery source includes recharging means.

12. A fairing and utility assembly as recited in claim 11 wherein said recharging means includes solar collectors.

13. A fairing and utility assembly as recited in claim 12 wherein said rear tail assembly as adapted to receive saddle bags thereover.

14. A fairing and utility assembly as recited in claim 13 wherein said solar collectors are mounted on said saddle bags.

15. A fairing and utility assembly as recited in claim 8 wherein said switching means includes an exterior light switch mounted in said lower dashboard panel.

16. A fairing and utility assembly as recited in claim 15 wherein said light and signal means includes a headlight mounted to a front portion of said outer surface and electrically connected to said exterior light switch.

17. A fairing and utility assembly as recited in claim 16 wherein said light and signal means includes a rear light mounted in a back face of said rear tail assembly and electrically connected to said exterior light switch.

18. A fairing and utility assembly as recited in claim 17 wherein said switching means includes a horn switch mounted in said lower dashboard panel.

19. A fairing and utility assembly as recited in claim 18 wherein said light and signal means includes a horn mounted to said front fairing assembly and electrically connected to said horn switch.

20. A fairing and utility assembly as recited in claim 19 wherein said switching means includes a turn signal switch mounted in said lower dashboard panel.

21. A fairing and utility assembly as recited in claim 20 wherein said light and signal means includes a left turn signal light and a right turn signal light mounted to a left and right side of said shell, respectively, and electrically connected to said turn signal switch.

22. A fairing and utility assembly as recited in claim 21 wherein said switching means includes a dash light switch mounted in said lower dashboard panel.

23. A fairing and utility assembly as recited in claim 22 wherein said light and signal means includes a dash light mounted in said lower dashboard panel and electrically connected to said dash light switch.

24. A fairing and utility assembly as recited in claim 23 wherein said lower dashboard panel includes an electrical cigarette lighter mounted thereon which is electrically connected to said junction box.

25. A fairing and utility assembly as recited in claim 24 wherein said car stereo audio source includes an antenna mounted on said rear tail assembly.

26. A fairing and utility assembly as recited in claim 25 wherein there are two of said speakers connected to said car stereo audio source, which are mounted to said upper portion of said inner face in a generally side-by-side relation.

27. A fairing and utility assembly as recited in claim 26 wherein said front compartment and said rear compartment in said rear tail assembly include hingedly attached doors thereon.

28. A fairing and utility assembly as recited in claim 27 wherein said rear tail assembly includes a pair of aerodynamic fins attached to opposite sides thereof.

29. For mounting on a bicycle; a fairing and utility assembly comprising:
   a front fairing assembly and a rear tail assembly, said front fairing assembly including a hollow aerodynamic shell, said aerodynamic shell including an inner face and an outer surface, said inner face including an upper portion and a lower dashboard portion, dash mounting means for removably securing said lower dashboard portion to said shell, a junction box mounted internally to a lower surface of said shell, which distributes electrical power from one source to a plurality of outputs, a headlight housed within said shell and protruding outwardly from a front portion of said outer surface so as to provide illumination in front of the bicycle, said headlight electrically interconnected within said shell to an exterior light switch, said exterior light switch further electrically interconnected with said junction box, said exterior light switch being mounted in said lower dashboard portion of said inner face such that a switching means of said exterior light switch protrudes partially therefrom, a car stereo audio source mounted in said lower dashboard portion of said inner face such that said audio source's on/off knob, tuning knob, and front face protrude from said lower dashboard portion of said inner face, said car stereo audio source electrically interconnected within said shell to said junction box, said car stereo audio source further connected within said shell to at least one speaker, said speaker mounted in said upper portion of said inner face such that sound is transmitted outwardly from said shell, shell mounting means for mounting said shell to the bicycle handle bar and handle bar support bracket, a horn attached to an exterior portion of said shell mounting means, said horn being electrically interconnected within said shell to a horn switch, said horn switch being mounted to said lower dashboard portion of said inner face such that a switch button protrudes therefrom, said horn being further electrically connected to said junction box, said junction box including a power input cable, said power input cable connected to a battery source in said rear tail assembly, said rear tail assembly including a front compartment and a rear compartment, said battery source being positioned within said front compartment, which is sized to securely hold said battery source, said front compartment including a first hingedly attached door, said rear compartment including a second hingedly attached door, a rear light mounted in a back face of said rear tail assembly so as to protrude from said rear tail assembly and be clearly visible to vehicles behind the bicycle, said rear light being electrically interconnected to said exterior light switch, rear mounting means for mounting said rear tail assembly to a standard bicycle rack, and aerodynamic fins attached to opposite sides of said rear tail assembly.

30. For mounting on a bicycle; a fairing and utility assembly comprising:

a front fairing assembly and a rear tail assembly, a junction box mounted within said front fairing assembly which distributes electrical power from one source to a plurality of outputs, said junction box in said front fairing assembly being connected to a battery source in said rear tail assembly, mounting means for mounting said front fairing assembly to a front of the bicycle and said rear tail assembly to a rear of the bicycle above a rear tire thereof, said mounting means including a plurality of L-shaped support brackets clamped to the bicycle handlebars and to said front fairing assembly, and said mounting means further including a support bar secured to said front fairing assembly and the bicycle's handlebar support brackets.

* * * * *